Feb. 20, 1968  A. T. METIER  3,369,837
VEHICLE VISOR DEVICE
Filed Nov. 12, 1965

INVENTOR.
ARDETH T. METIER
BY
Zarley, McKee & Thomte
ATTORNEYS 3,369,837
VEHICLE VISOR DEVICE
Ardeth T. Metier, 409 Fourth St., SW.,
Spencer, Iowa 51301
Filed Nov. 12, 1965, Ser. No. 507,459
4 Claims. (Cl. 296—97)

ABSTRACT OF THE DISCLOSURE

A vertically and horizontally adjustable extension for a visor comprising a flat member adapted to be magnetically affixed to the visor. The visor may have a plurality of magnets embedded within the visor or a magnet carrying support may be detachably secured to the visor.

---

The conventional vehicle visors are unsatisfactory for several reasons. The lower edge of the conventional vehicle visor does not extend a sufficient distance downwardly to keep the rays of the sun from the eyes of the driver, especially when the driver is a short person. The conventional vehicle visors do not keep the rays of the sun from entering the vehicle at a point between the visors at the driver and passenger sides of the vehicle. Additionally, when the conventional visor is pivoted to cover a side window of the vehicle, the visor does not adequately cover the window. Perhaps the main reason that the conventional visors are not large enough is that the vehicle manufacturers are possibly concerned about the amount of space that a large visor would occupy and also the aesthetic appearance of a large visor.

Therefore, it is a principal object of this invention to provide a vehicle visor device which is detachably and adjustably secured to a vehicle visor.

A further object of this invention is to provide a vehicle visor device which may be adjustably positioned with respect to the vehicle visor to adequately prevent the rays of the sun from entering the vehicle.

A further object of this invention is to provide a vehicle visor device which is attractive.

A further object of this invention is to provide a vehicle visor device which is easily moved to a non-operative position and when placed in a non-operative position, does not detract from the aesthetic appearance of the interior of the vehicle.

A further object of this invention is to provide a vehicle visor device which is economical of manufacture, durable in use and refined in appearance.

These and other objects are apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

Figure 1:
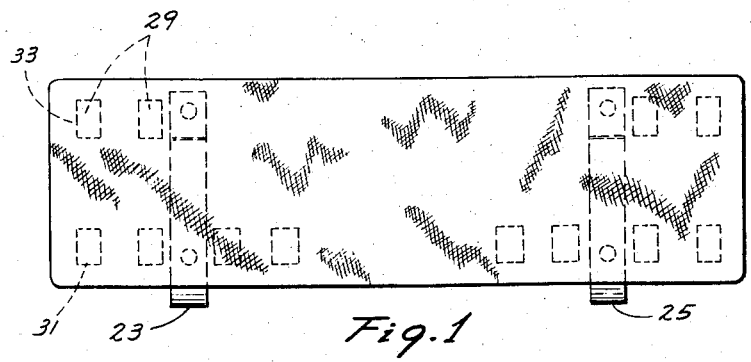
FIG. 1 is a front elevational view of the device.
Figure 2:
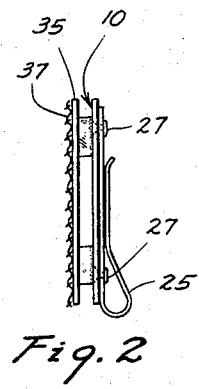
FIG. 2 is an end view of the device seen in FIG. 1.
Figure 5:
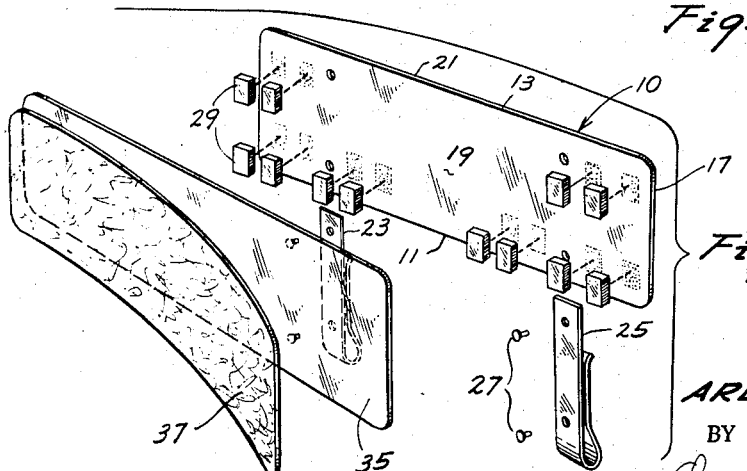
FIG. 5 is an exploded perspective view of the device of FIG. 1.

With respect to the embodiment of FIGS. 1, 2 and 5, the numeral 10 generally designates a flat rectangular plate including a bottom edge 11, top edge 13, opposite side edges 15 and 17, front 19 and back 21. A pair of spaced apart spring clips 23 and 25 are secured to plate 10 at back 21 thereof by means of rivets 27 extending through plate 10 and spring clips 23 and 25.

A plurality of magnets 29 are secured to front 19 of plate 10 by any suitable means such as adhesive or the like and are arranged in a bottom row 31 and a top row 33. A flat metal plate 35, having a shape corresponding to plate 10, is adapted to be magnetically affixed to magnets 29 and is provided with a covering 37 on its front side. Covering 37 may be comprised of plastic, fabric or other suitable material which will blend with or match the interior of the vehicle. The back surface of covering 37 may be provided with a suitable adhesive or the like so that covering 37 may be removed from plate 35 and replaced if desired.

Figures 3, 4:
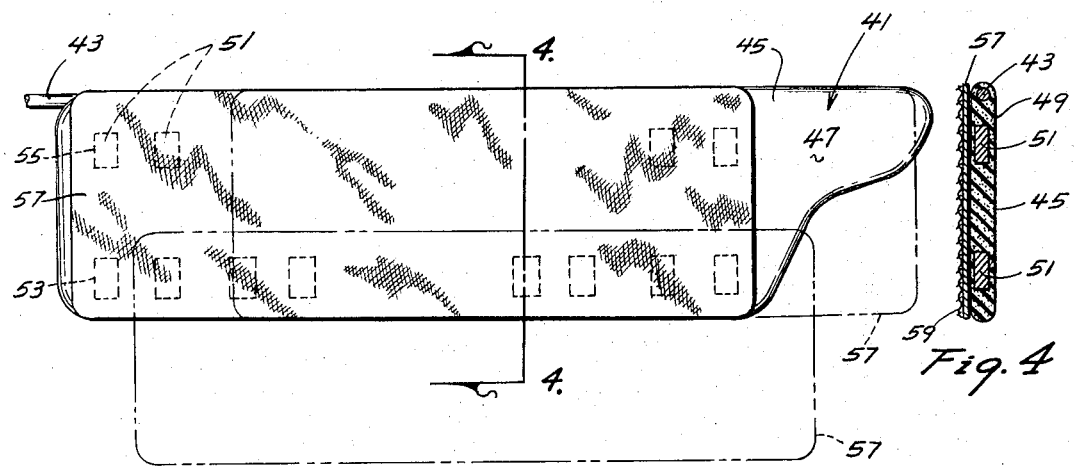
FIG. 3 is a front elevational view of a modified version of the device.
FIG. 4 is a sectional view as seen on line 4—4 of FIG. 3.

With respect to the modification of FIGS. 3 and 4, the numeral 41 generally designates the vehicle visor assembly including a rod 43, which is swingably secured at one end to the vehicle, and a visor 45 mounted thereon. For purposes of description, visor 45 will be described as having a front surface 47 and a back surface 49. Visor 45 may be comprised of any material commonly used in the manufacture thereof such as cloth, plastic or foam rubber. During the manufacture of visor 45, a plurality of magnets 51 are embedded in the interior thereof adjacent front surface 47 (FIG. 4). Magnets 51 are arranged in visor 45 in a bottom row 53 and a top row 55. A flat, rectangular metal plate 57 is adapted to be magnetically affixed to visor 45 adjacent front surface 47 and has a covering 59 on its front surface. Covering 59 may be comprised of plastic, fabric or other suitable material which will blend with or match the interior of the vehicle. The back surface of covering 59 may be provided with a suitable adhesive or the like so that covering 59 may be removed and replaced if desired.

The normal method of operation of the embodiment of FIGS. 1, 2 and 5 is as follows. Plate 10 is secured to the vehicle visor by means of spring clips 23 and 25. Spring clips 23 and 25 may be positioned on the vehicle visor so that they receive either the upper or lower edges thereof but preferably should embrace the lower edge (that edge which is lowermost when the vehicle visor has been rotated to an operative position). When the vehicle visor has been rotated to its operative position, plate 10 would be positioned between the driver or passenger as the case may be and the vehicle visor. Plate 57 may then be moved either downwardly or laterally with respect to plate 10 to increase the effective shading area of the vehicle visor. When plate 35 is moved downwardly with respect to plate 10, the upper portion of plate 35 will be magnetically affixed to the bottom row 31 of magnets 29 to prevent disengagement thereof. When plate 35 is moved laterally with respect to plate 10, the magnets 29 adjacent one side thereof together with various of the other magnets 29 will maintain plate 35 on plate 10. When the vehicle visor is returned to its non-operative position, plate 35 may be positioned on plate 10 in a superimposed position so that the device will not extend from the vehicle visor but will be concealed thereby.

Plate 10 may be secured to the vehicle visor by means other than spring clips 23 and 25 if desired, such as by springs, elastic or the like.

The embodiment of FIGS. 3 and 4 is utilized as the embodiment of FIGS. 1, 2 and 5 except that the need for a mounting plate such as plate 10 is eliminated. The embodiment of FIGS. 3 and 4 will perhaps be more attractive than the embodiment of FIGS. 1, 2 and 5 although both embodiments function in an equally well manner. The broken lines in FIGS. 3 and 4 illustrate some of the positions which plate 57 may be moved to with respect to visor 45.

Both of the embodiments just described are adapted to be moved laterally or downwardly to prevent the rays of the sun from entering the vehicle. The devices just described work equally as well whether the vehicle visor is being utilized to shade the windshield or side window areas.

The invention of this application eliminates the requirement of the driver or the passenger as the case may be to shield his eyes with his hand or the like in an inadequate attempt to shade his eyes. The device is extremely versatile and does not detract from the aesthetic appearance of the vehicle interior.

Thus it can be seen that the device accomplishes at least all of its stated objectives.

Some changes may be made in the construction and arrangement of my Vehicle Visor Device without departing from the real spirit and purpose of my invention, and it is my intention to cover by my claims, any modified forms of structure or use of mechanical equivalents which may be reasonably included within their scope.

I claim:

1. In a vertically and horizontally adjustable extension for a visor,
   a support means adapted to be detachably secured to the visor and being substantially complementary in shape thereto, said support means having opposite side edges,
   a first row of magnets operatively secured to said support means adjacent its lower end and parallel thereto,
   a second row of magnets operatively secured to said support means between said first row and said upper end,
   said first and second rows of magnets being parallel with respect to each other,
   and a rectangular flat member adapted to be adjustably magnetically affixed to said magnets,
   said magnets being disposed in said first and second rows whereby said flat member may be adjustably moved downwardly on said support means for substantially all of its width whereby said flat member will engage only said first row of magnets and whereby said flat member may be adjustably moved horizontally on said support means for substantially all of its length whereby said flat member will engage the magnets in said first and second rows adjacent one of the side edges of said support means.

2. The device of claim 1 wherein said flat member has at least one side thereof which is covered with a material complementary with the interior of the vehicle.

3. The device of claim 1 wherein said support means includes at least one spring clip means detachably secured to the vehicle visor and at least one supporting member secured thereto, said supporting member having said plurality of magnets operatively secured thereto.

4. In a visor device,
   a visor having upper and lower ends and opposite edges,
   a first row of magnets embedded and enclosed within said visor adjacent its lower end and parallel thereto,
   a second row of magnets embedded and enclosed within said visor between said first row and said visor upper end,
   said first and second rows of magnets being parallel with respect to each other,
   and a rectangular flat member adapted to be adjustably magnetically affixed to said visor,
   said magnets being disposed in said first and second rows whereby said flat member may be adjustably moved downwardly on said visor for substantially all of its width whereby said flat member will be magnetically secured to said visor by only said first row of magnets and whereby said flat members may be adjustably moved horizontally on said visor for substantially all of its length whereby said flat member will be magnetically secured to said visor by the magnets in said first and second rows adjacent one of the side edges of the visor.

References Cited

UNITED STATES PATENTS

| 2,414,653 | 1/1947 | Lookholder. | |
| 2,603,530 | 7/1952 | Jones | 296—97 |
| 3,085,827 | 4/1963 | Cederberg | 296—97 |
| 3,259,424 | 7/1966 | Swick | 296—97 |

LEO FRIAGLIA, *Primary Examiner.*

BENJAMIN HERSH, *Examiner.*

J. A. PEKAR, *Assistant Examiner.*